(12) United States Patent
Zhang (10) Patent No.: US 6,526,197 B2
(45) Date of Patent: Feb. 25, 2003

(54) MEMS OPTICAL BALANCED PATH SWITCH

(75) Inventor: Nan Zhang, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/829,212

(22) Filed: Apr. 9, 2001

(65) Prior Publication Data

US 2002/0146199 A1 Oct. 10, 2002

(51) Int. Cl.[7] ............................. G02B 6/26; G02B 6/42
(52) U.S. Cl. ................................... 385/18; 359/163
(58) Field of Search ........................ 385/16, 17, 18, 385/19, 24, 25, 27, 31, 39, 48, 52; 359/223, 224, 163, 174; 65/406, 408, 411, 485, 484, 501

(56) References Cited

U.S. PATENT DOCUMENTS

| | | | |
|---|---|---|---|
| 5,073,040 A | | 12/1991 | Guinard |
| 5,245,680 A | * | 9/1993 | Sauter ........................ 359/163 |
| 5,999,303 A | * | 12/1999 | Drake ........................ 359/223 |
| 6,049,650 A | * | 4/2000 | Jerman et al. ................. 385/11 |
| 6,237,370 B1 | * | 5/2001 | Bloom ........................ 65/406 |
| 6,343,171 B1 | * | 1/2002 | Yoshimura et al. ........... 385/14 |
| 6,360,035 B1 | * | 3/2002 | Hurst et al. .................... 385/16 |

FOREIGN PATENT DOCUMENTS

| | | |
|---|---|---|
| EP | 0 410 619 A2 | 1/1991 |
| WO | WO 98/12589 | 3/1998 |
| WO | WO 98/43124 | 10/1998 |
| WO | WO 01/11411 A1 | 2/2001 |

* cited by examiner

Primary Examiner—Akm E. Ullah
(74) Attorney, Agent, or Firm—Merchant & Gould P.C.

(57) ABSTRACT

An optical switch formed on a substrate with receiving channels defined by alignment grooves formed in the substrate that are offset from alignment grooves that form the inputting channels. The offset receiving channels reduce the output power differentiation from an optical switch in which there is no offset.

17 Claims, 8 Drawing Sheets

MEMS OPTICAL BALANCED PATH SWITCH

BACKGROUND OF THE INVENTION

Figure 1:
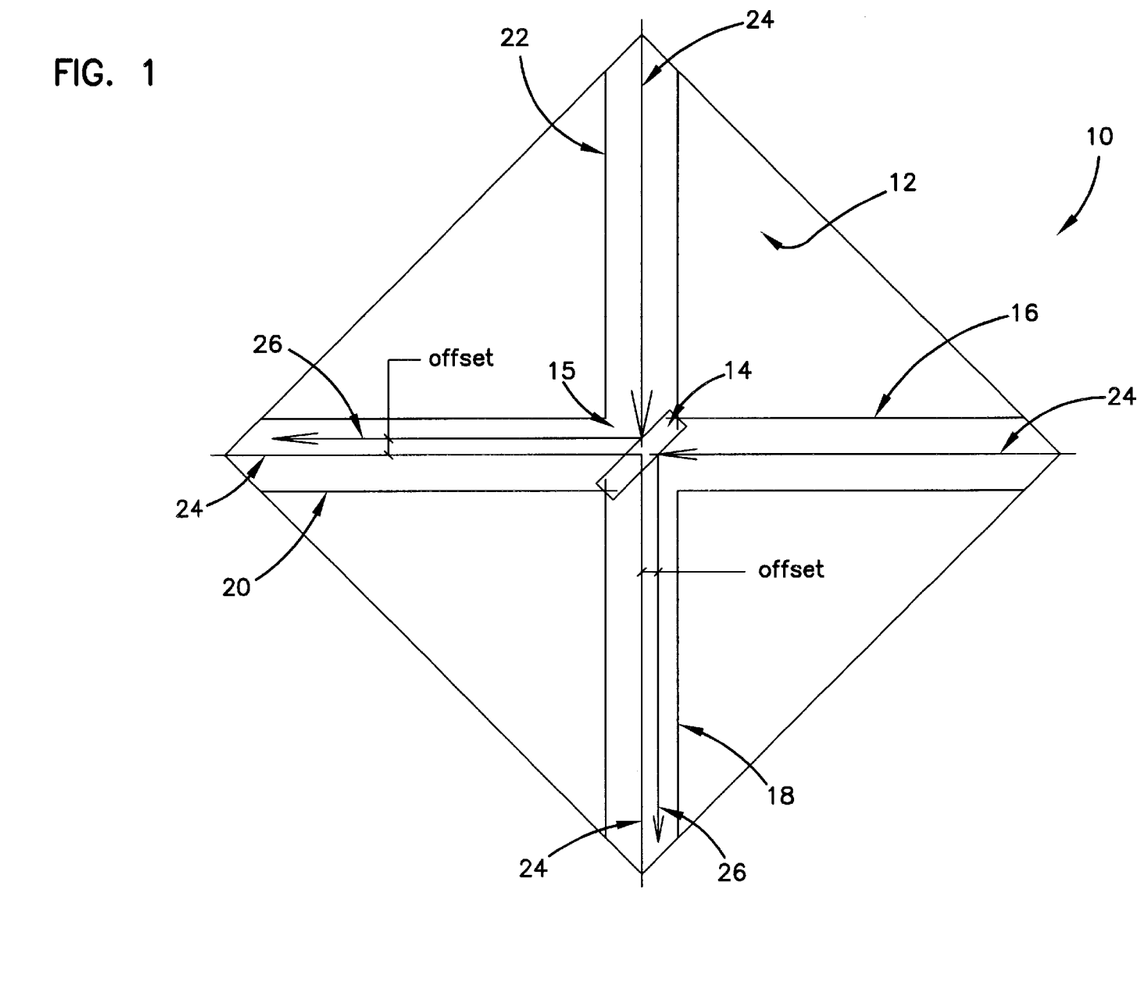
FIG. 1 is a top view of a switch formed on a substrate according to the prior art.

Optical switches formed on a substrate are known. Because of their reduced size, microelectromechanical (MEMS) technology is employed to provide the actuation to cause switching. FIG. 1 is a top view of a switch 10 formed on a substrate 12 according to the prior art. The switch 10 includes a mirror 14 which can be moved in and out of an intersection region 15 by MEMS actuators (not shown). FIG. 1 shows the mirror located in the intersection region 15. The switch also includes a first alignment groove 16, a second alignment groove 18, a third alignment groove 20 and a fourth alignment groove 22. Each alignment groove 16–22 has a central axis 24. Each alignment groove is dimensioned to receive a piece of fiber or waveguide therein (not shown).

The first and the fourth alignment grooves 16, 22 hold fiber or waveguides that form the inputting channels of the switch. The second and third alignment grooves 18, 20 hold fiber or waveguides that form the receiving channels of the switch. Depending upon the position of mirror 15, inputting channel 16 may be coupled to one of either receiving channels 18, 20. The same is true for inputting channel 22.

The switch is a 2×2 switch. If a beam is input into a fiber or waveguide located in the first alignment groove 16 and the mirror 14 is retracted from the intersection region 15, the beam passes straight through the intersection region 15 and is output from a fiber or waveguide positioned in the third alignment groove 20. Now if the mirror 14 is positioned in the intersection region 15, the beam is reflected by the mirror to a fiber or waveguide located in the second alignment groove 18. The beam, however, is offset from the central axis 24 of the second alignment groove 18 as indicated by line 26. The reason for this is that the mirror has a thickness associated therewith. The thickness of the mirror offsets the beam's path from the central axis 24 of the groove 18 receiving the beam after the beam is reflected by the mirror 14.

Similarly, if a beam is input into a fiber or waveguide located in the fourth alignment groove 22 and the mirror 14 is retracted from the intersection region 15, the beam passes straight through the intersection region 15 and is output by a fiber or waveguide positioned in the second alignment groove 18. If the mirror is located in the intersection region 15, the beam is reflected into a waveguide or fiber located in the third alignment groove 20. Because of the thickness of the mirror, however, the beam is offset from the central axis 24 of the third alignment groove 20.

This offset creates several disadvantages. First, the offset causes higher insertion loss than the case when the mirror 14 is retracted from the intersection region 15 and the beam travels straight through. This causes an output power differentiation between the straight through beam and. the reflected beam of as much as 1.3 dB. This differentiation is undesirable in optical networks. To overcome this variable, optical attenuators may need to be added to obtain uniform outputs, however, such a remedy results in higher costs and more complicated designs.

Thus, it is desirable to provide an optical switch that substantially reduces or eliminates offset in the reflected beam. In addition, it is desirable to provide an optical switch that substantially reduces or eliminates the offset without additional structure thereby simplifying the design of the switch. Also, it is desirable to provide an optical switch that has a simple design which is amenable to formation by batch processes.

SUMMARY OF THE INVENTION

According to a first aspect of the present invention, there is provided an optical switch that includes a substrate having a first, second, third and fourth edge and a center region. Located on the substrate are a first, second, third and fourth alignment grooves. The first alignment groove extends from the first edge of the substrate to the center region of the substrate and has a first center axis that extends down the center of the first alignment groove. The second alignment groove extends from the second edge of the substrate to the center region of the substrate where the second edge of the substrate opposes the first edge of the substrate. The second alignment groove has a second center axis that extends down the center of the second alignment groove, and the second center axis is offset from the first center axis. The third alignment groove extends from the third edge of the substrate to the center region of the substrate and has a third center axis that extends down the center of the third alignment groove. The fourth alignment groove extends from the fourth edge of the substrate to the center region of the substrate and has a fourth center axis that extends down the center of the fourth alignment groove, and the fourth center axis is offset from the third center axis.

According to a second aspect of the invention, there is provided an alignment structure for an optical switch. The structure includes a first, second, third and fourth groove disposed in a substrate. The first groove extends from a first end to an intersection region, the second groove extends from a second end located remotely from the first end to the intersection region, the third groove extends from a third end located remotely from the first and second ends to the intersection region, and the fourth groove extends from a fourth end located remotely from the first, second, and third ends to the intersection region. The first and second groove meet in the intersection region and the second groove is offset from the first groove and the third and fourth groove meet in the intersection region and the fourth groove is offset from the third groove.

According to a third aspect of the invention, there is provided a method of making an optical switch. The method includes the steps of:

forming a first alignment groove on a substrate wherein the first alignment groove extends from the first edge of the substrate to the center region of the substrate, the first alignment groove having a first center axis that extends down the center of the first alignment groove;

forming a second alignment groove on the substrate wherein the second alignment groove extends from the second edge of the substrate to the center region of the substrate, wherein the second edge of the substrate opposes the first edge of the substrate, the second alignment groove having a second center axis that extends down the center of the second alignment groove wherein the second center axis is offset from the first center axis;

forming a third alignment groove on the substrate wherein the third alignment groove extends from the third edge of the substrate to the center region of the substrate; the third alignment groove having a third center axis that extends down the center of the third alignment groove; and forming a fourth alignment groove on the substrate wherein the fourth alignment groove extends from the fourth edge of the substrate to the center region of the substrate, the fourth alignment groove having a fourth center axis that extends down the center of the fourth alignment groove wherein the fourth center axis is offset from the third center axis.

DETAILED DESCRIPTION OF THE PRESENTLY PREFERRED EMBODIMENTS

Various embodiments of the present invention will be described in detail with reference to the drawings, wherein like reference numerals represent like parts and assemblies through the several views. Reference to various embodiments does not limit the scope of the invention, which is limited only by the scope of the claims attached hereto.

Figures 2, 3:
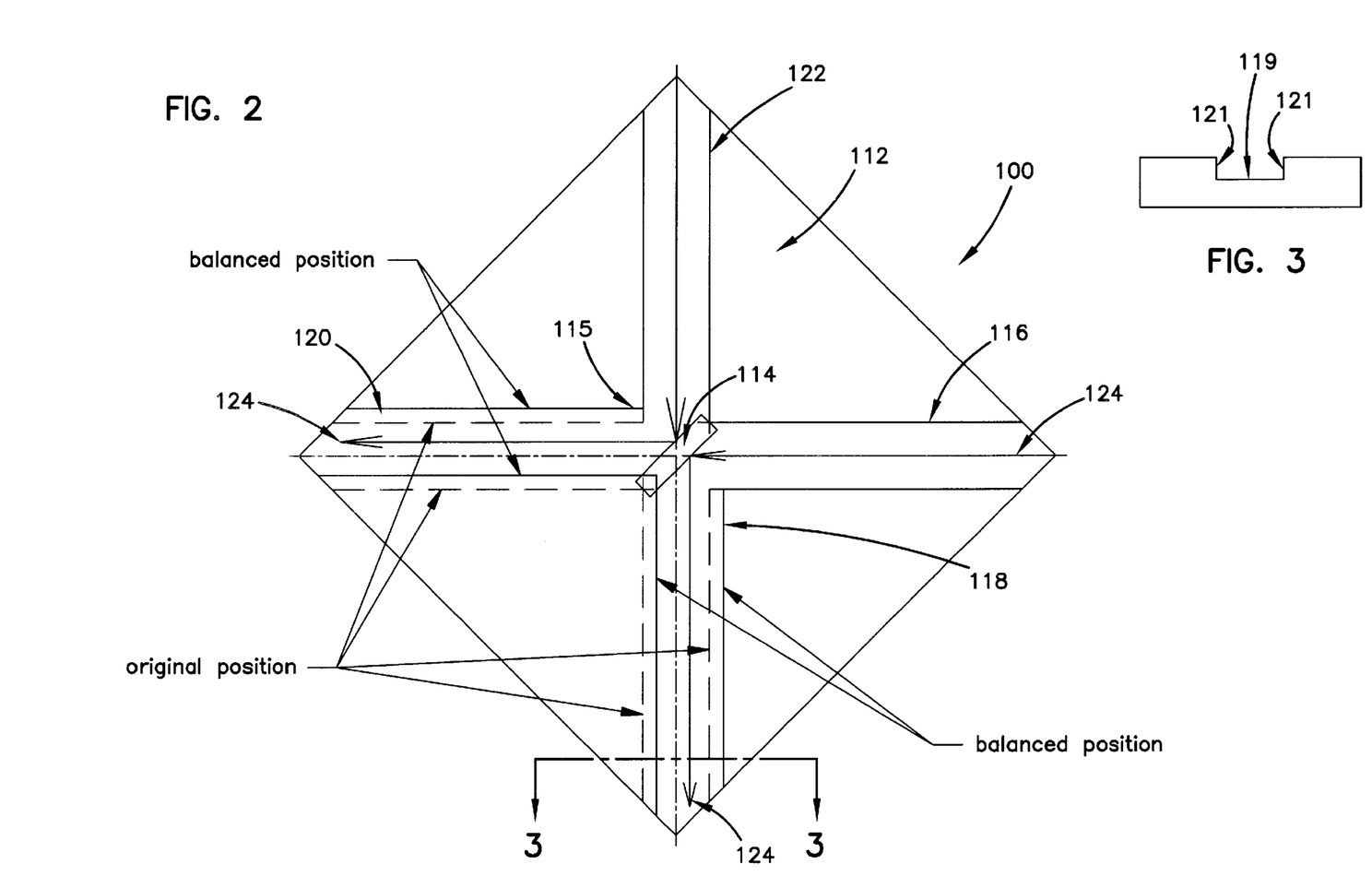
FIG. 2 is a top view of a switch formed on a substrate according to a preferred embodiment of the present invention.
FIG. 3 is a cross-sectional view of the switch shown in FIG. 2 taken along line 3—3.

FIG. 2 is a top view of a switch 100 formed on a substrate 112 according to a preferred embodiment of the present invention. The disadvantages of output power differentiation discussed with reference to the switch shown in FIG. 1 are eliminated in the switch of the present invention by the design of the substrate itself. As seen in FIG. 2, a 2×2 switch 100 is shown. The switch 100 is formed on a substrate 112 and includes a first alignment groove 116, a second alignment groove 118, a third alignment groove 120 and a fourth alignment groove 122. The alignment grooves 116–122 are dimensioned to receive a piece of fiber or waveguide therein. Each alignment groove extends from an edge of the substrate and intersects the other alignment grooves at an intersection region 115 generally located at the center of the substrate. A mirror 114 can be inserted into the intersection region 115 and retracted therefrom depending on the output desired.

Unlike the switch shown in FIG. 1, the central axes 124 of the second alignment groove 118 and the third alignment groove 120 are offset from the central axes of the fourth alignment groove 122 and the first alignment groove 116 respectively.

Now, when a beam is input in a fiber or waveguide positioned in the first alignment groove 116 and the mirror 114 is inserted in the intersection region 115, the reflected beam travels down the central axis 124 of the second alignment groove 118 instead of being offset therefrom as is the case with the switch shown in FIG. 1. The position of the second and third alignment grooves and their central axes which are not offset as in FIG. 1 are illustrated in dashed line for comparison purposes.

By designing the second and third alignment grooves offset from the prior art design shown in FIG. 1, coupling efficiency from the reflected channels is increased because the beam is traveling along the central axes of their offset grooves. With respect to the straight through beam paths, the receiving fiber is now slightly offset, however, since there is no mirror reflection for this straight through channel, the path maintains a relatively good insertion loss. The design of the optical switch according to the preferred embodiments of the invention provides better uniformity between the reflected receiving channels and the straight through receiving channels. If the mirror 114 has a thickness ranging from about 3 to about 5 $\mu$m, then the offset of the receiving channels should be from about 1.5 to about 3.5 $\mu$m.

FIG. 3 is a cross-sectional view of the switch shown in FIG. 2 taken along lines 3—3. In a preferred embodiment, the second alignment groove 118 has a flat bottom section 119 and vertical side walls 121, although other shapes may be used. For example, the side walls 121 could be slanted instead of vertical, the bottom section 119 of the groove could be curved. The formation of the grooves in the substrate are created by standard semiconductor fabrication techniques and thus need not be described in further detail.

Figure 4:
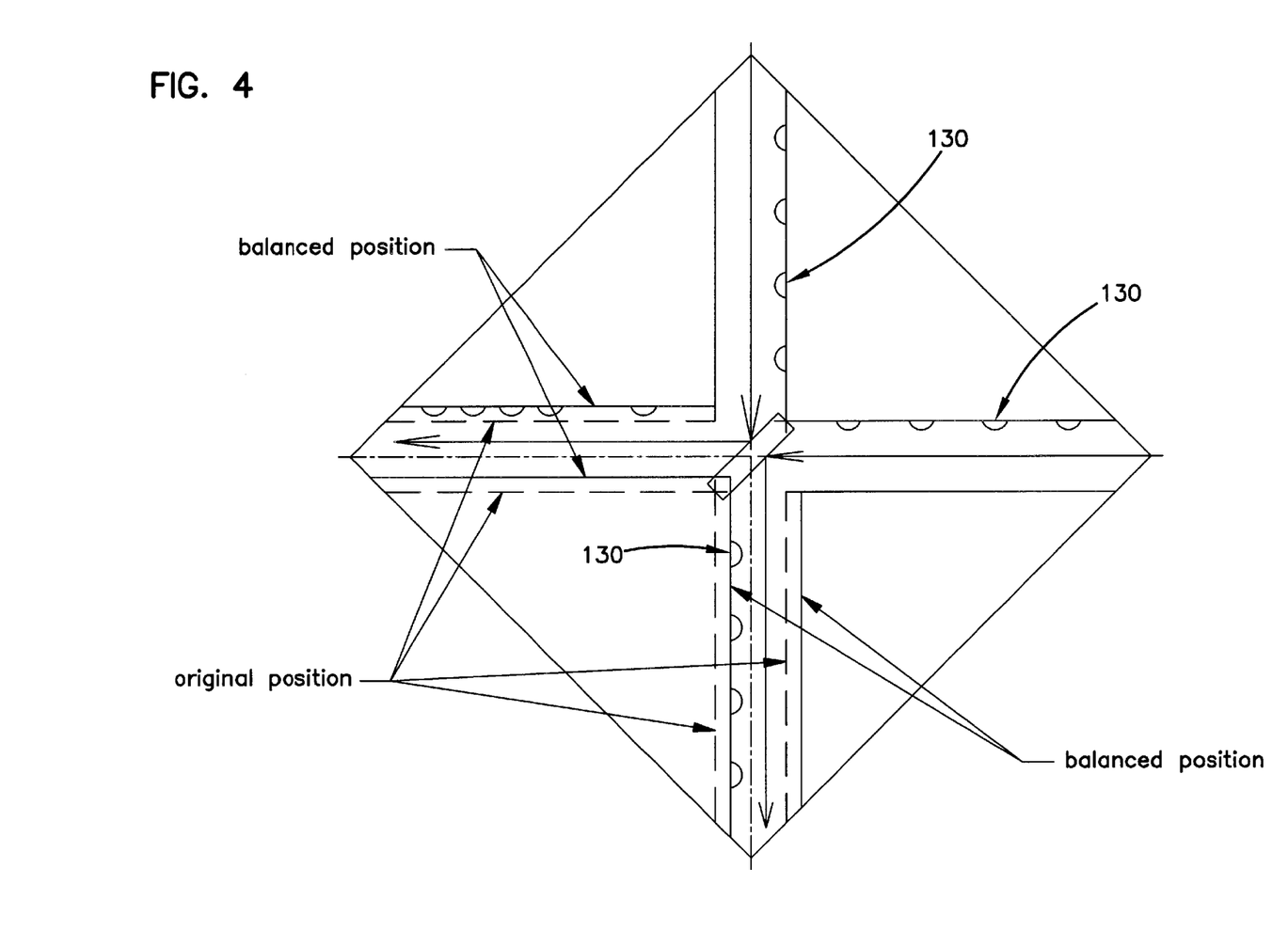
FIG. 4 is a top view of a switch formed on a substrate according to another preferred embodiment of the present invention.

FIG. 4 is a top view of an optical switch according to another preferred embodiment of the present invention. In this preferred embodiment, spring arms 130 are positioned along one side wall of each alignment groove. The spring arms 130 help retain a piece of fiber or waveguide in the alignment groove by pushing it against the opposite side wall. While the spring arms 130 are shown along particular sides of each groove, they could likewise be located on the opposite side wall of they may be located on both side walls or only portions of both side walls.

Figure 5:
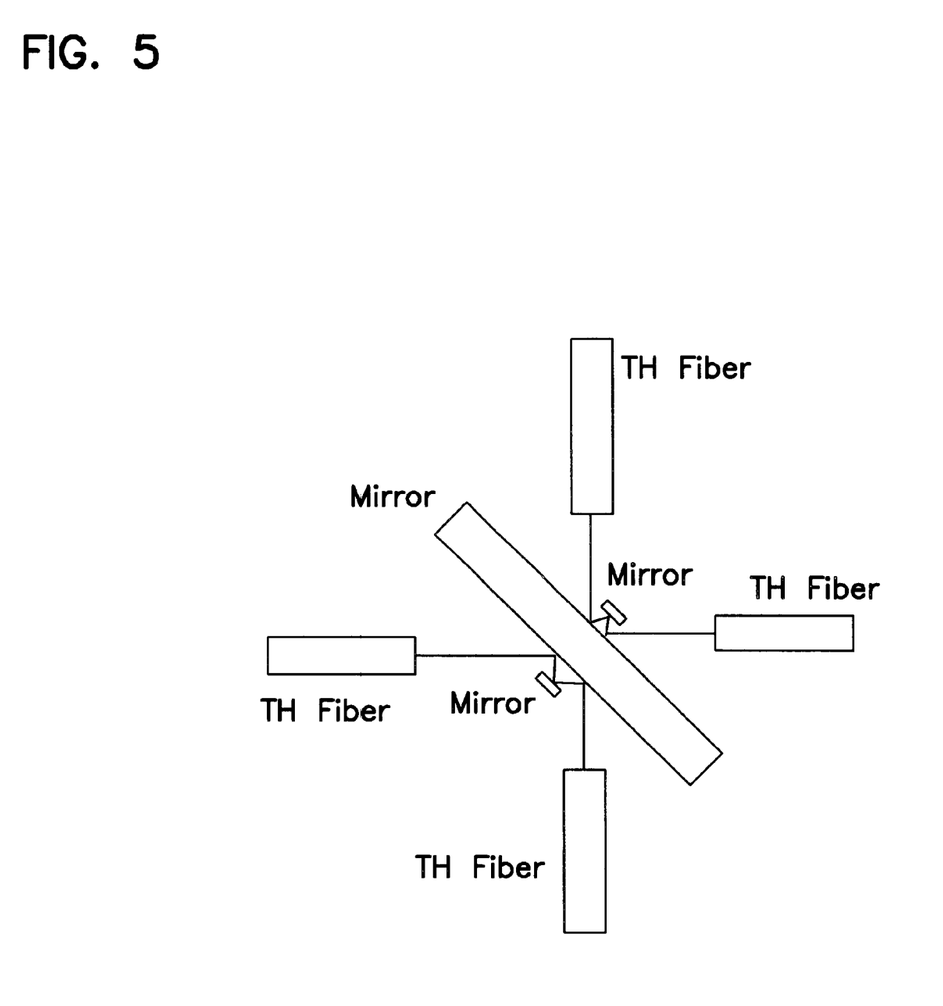
FIG. 5 is a plan view of an optical switch according to the prior art using multiple mirror compensation.

The optical switch of the present invention features a very simple design, compatible processing with previous switches, and easy assembly. This design balances the optical path without adding other elements, such as micromirrors, or lenses. Adding mirrors to balance the optical path results in a switch with high losses due to multiple mirror reflections. Also, adding mirrors increases design complexity and might result in low fabrication yield if one of the mirrors fails to perform in an optical path. FIG. 5 is an example of such a prior art mirror compensated switch.

FIGS. 6–9 demonstrate four alternative switch layouts. The mechanics by which the mirror may be moved to provide reflection are multiple.

Figure 6:
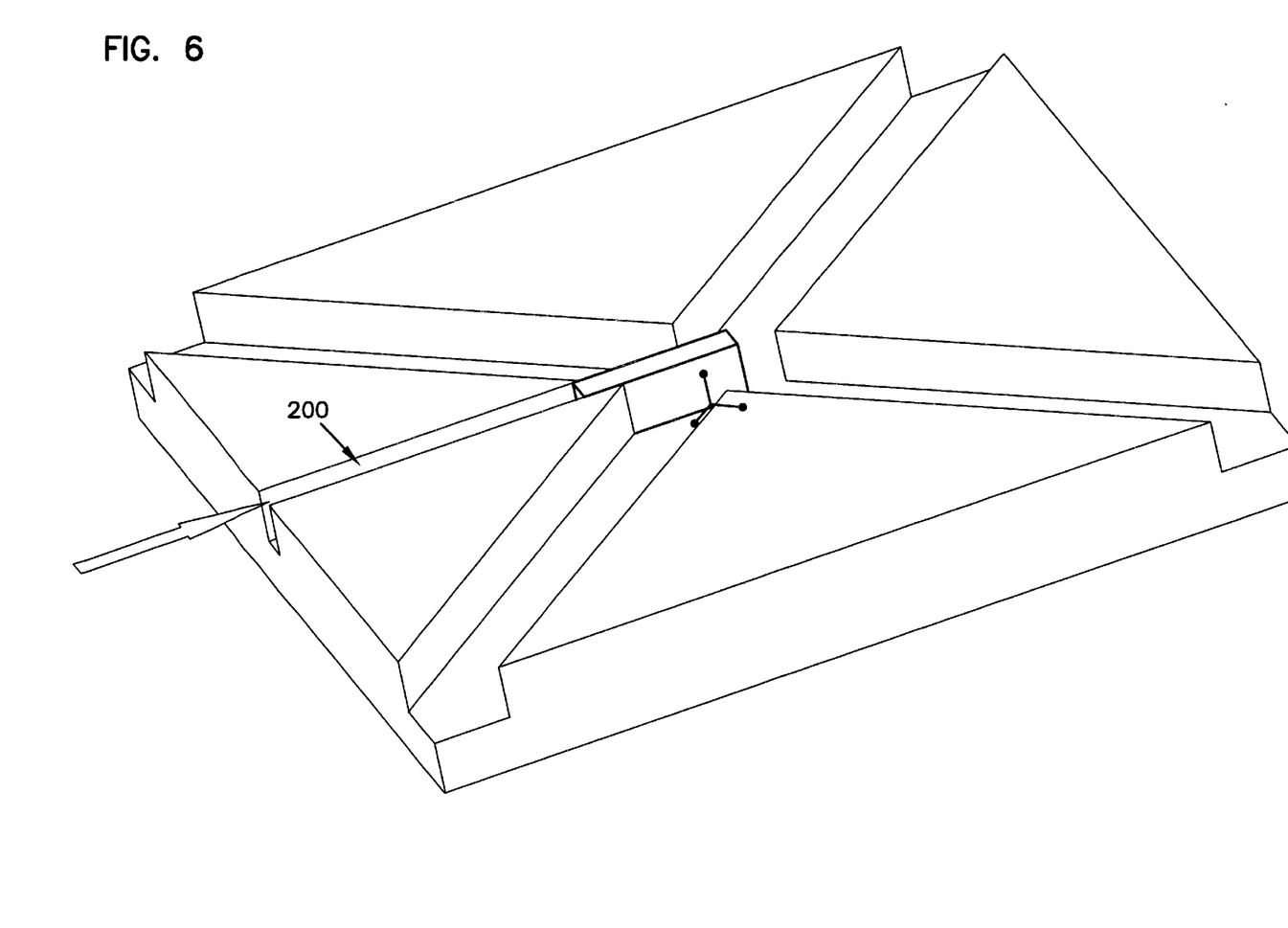
FIGS. 6–9 are top perspective views of optical switches according to alternative preferred embodiments of the present invention.

FIG. 6 which is a perspective view of an optical switch formed on a substrate, the mirror is linearly driven in and out of the intersection zone. A mirror groove 200 is formed in the substrate and the mirror is housed in the mirror groove when it is in its retracted position. The mirror is inserted into the intersection zone by a microelectromechanical (MEM) actuator (not shown).

Figure 7:
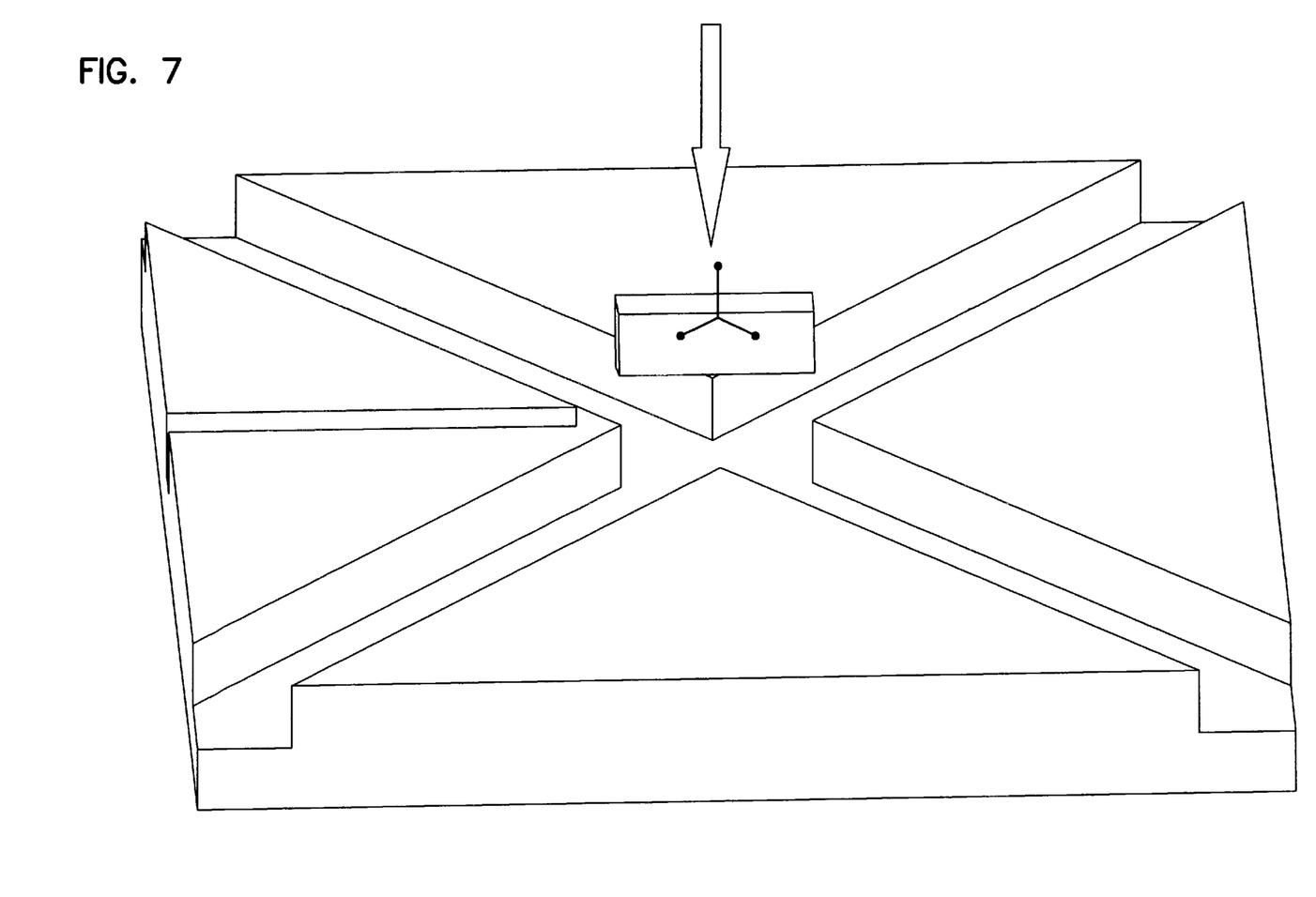

FIG. 7 shows a perspective view of an optical switch formed on a substrate in which a mirror is dropped into the intersection zone when reflection is to occur and lifted out of the intersection region when no reflection is to occur. The mirror may be moved by an actuator located on a different substrate, for example.

Figure 8:
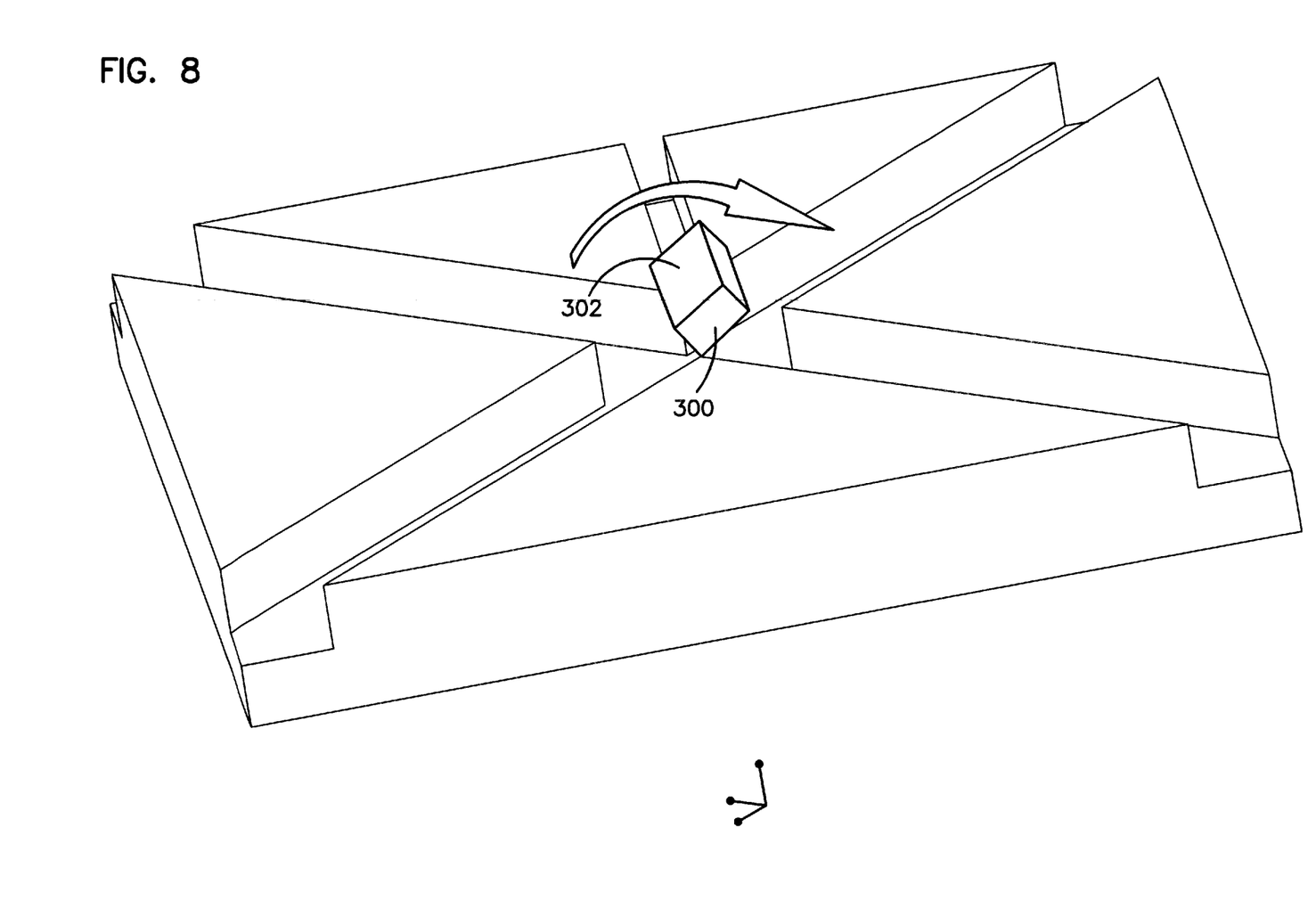

FIG. 8 is a perspective view of an optical switch formed on a substrate in which a mirror is rotated in the intersection region. More particularly, a bar 300 is made of a translucent material through which a beam can pass through. A surface 302 of the bar is made reflective for example, by depositing a reflecting coating on that surface of the bar. If reflection is to be provided, the bar is rotated so that the beam entering the intersection region encounters the reflective surface of the bar. If the beam is to be passed straight through the intersection region, then the bar is rotated so that the beam encounters the bar's translucent material and passes straight through the bar.

Figure 9:
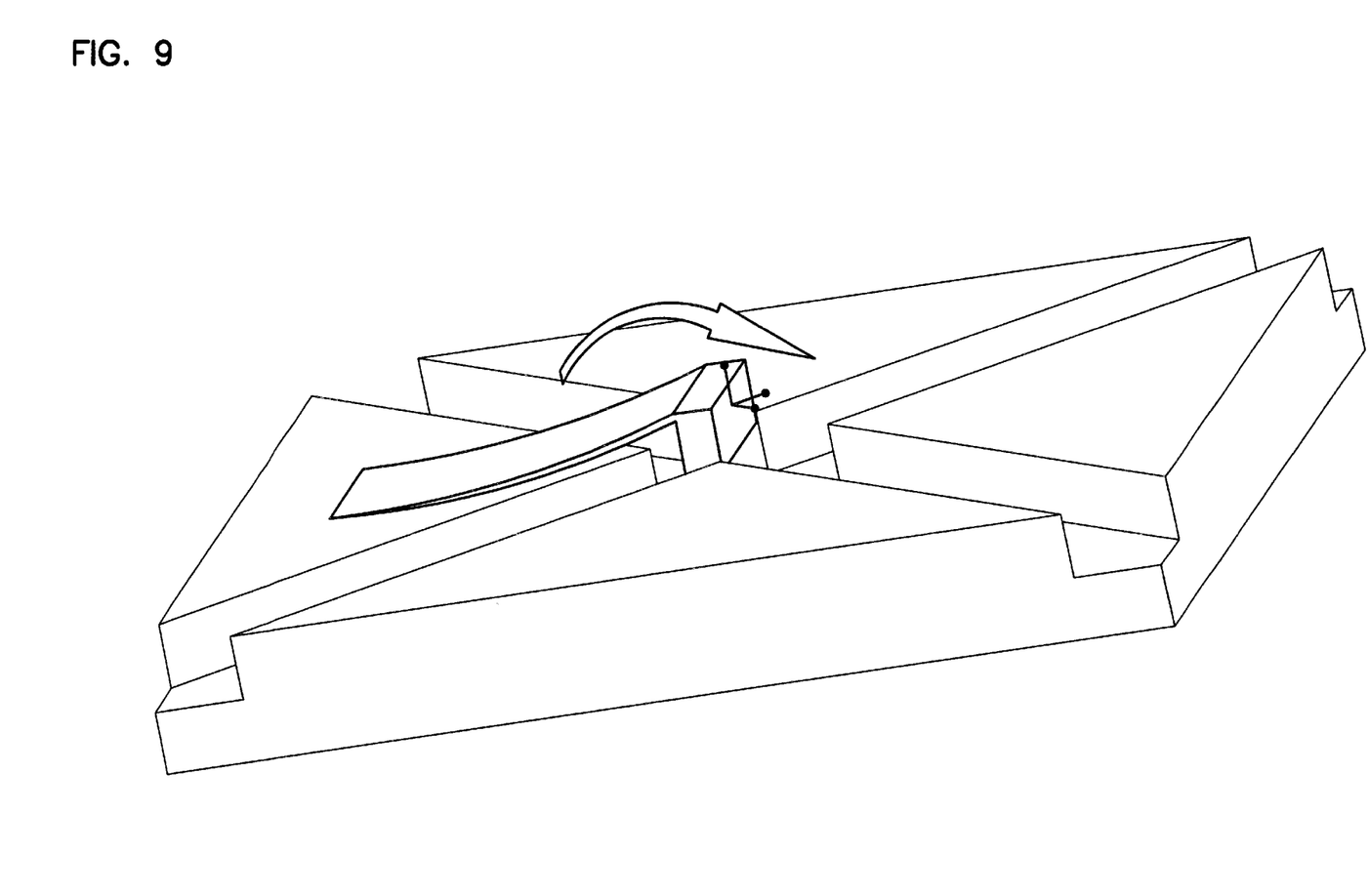

FIG. 9 is a perspective view of an optical switch formed on a substrate according to another preferred embodiment of the present invention. In this preferred embodiment, the mirror is moved in and out of the intersection region by stress, such as thermal stress or electrostatic stress.

While the invention has been particularly shown and described with reference to preferred embodiments thereof, it will be understood by those of ordinary skill in the art to which this invention pertains that various other changes in the form and details may be made therein without departing from the spirit and scope of the invention.

What is claimed is:

1. An optical switch comprising:
   a substrate, the substrate having a first, second, third and fourth edge and a center region;
   a first alignment groove located on the substrate wherein the first alignment groove extends from the first edge of the substrate to the center region of the substrate, the first alignment groove having a first center axis that extends down the center of the first alignment groove;
   a second alignment groove located on the substrate wherein the second alignment groove extends from the second edge of the substrate to the center region of the substrate, wherein the second edge of the substrate opposes the first edge of the substrate, the second alignment groove having a second center axis that extends down the center of the second alignment groove wherein the second center axis is offset from the first center axis;
   a third alignment groove located on the substrate wherein the third alignment groove extends from the third edge of the substrate to the center region of the substrate; the third alignment groove having a third center axis that extends down the center of the third alignment groove; and
   a fourth alignment groove located on the substrate wherein the fourth alignment groove extends from the fourth edge of the substrate to the center region of the substrate, the fourth alignment groove having a fourth center axis that extends down the center of the fourth alignment groove wherein the fourth center axis is offset from the third center axis.

2. The switch of claim 1 wherein the offset ranges from about 1.5 µm to about 3.5 µm.

3. The switch of claim 1 further comprising a removable mirror located in the center region of the substrate.

4. The switch of claim 3 wherein the mirror has a thickness and the offset is equal to the thickness of the mirror.

5. The switch of claim 1 wherein the first, second, third and fourth alignment grooves are dimensioned to house a waveguide therein.

6. The switch of claim 1 wherein the first, second, third and fourth alignment grooves are dimensioned to house a piece of optic fiber therein.

7. The switch of claim 1 further comprising a spring arm formed in a side wall of the first, second, third and fourth alignment grooves that deform to accept a piece of fiber in the grooves and once the fiber is disposed in the grooves the spring arm deflects to push the fiber against an opposite side wall of each groove.

8. The switch of claim 1 further comprising a plurality of spring arms formed in a side wall of each first, second, third and fourth alignment grooves that deform to accept a piece of fiber in the grooves and once the fiber is disposed in the grooves the spring arms deflect to push the fiber against an opposite side wall of each groove.

9. An alignment structure for an optical switch, the structure comprising:
   a first groove disposed in a substrate, the first groove extending from a first end to an intersection region;
   a second groove disposed in the substrate, the second groove extending from a second end located remotely from the first end to the intersection region;
   a third groove disposed in the substrate, the third groove extending from a third end located remotely from the first and second ends to the intersection region;
   a fourth groove disposed in the substrate, the fourth groove extending from a fourth end located remotely from the first, second, and third ends to the intersection region;
   wherein the first and second groove meet in the intersection region and the second groove is offset from the first groove and the third and fourth groove meet in the intersection region and the fourth groove is offset from the third groove.

10. The structure of claim 9 wherein the offset ranges from about 1.5 µm to about 3.5 µm.

11. The structure of claim 9 further comprising a removable mirror located in the intersection region.

12. The structure of claim 11 wherein the mirror has a thickness and the offset is equal to the thickness of the mirror.

13. The structure of claim 9 wherein the first, second, third and fourth grooves are dimensioned to house a waveguide therein.

14. The structure of claim 9 wherein the first, second, third and fourth grooves are dimensioned to house a piece of optic fiber therein.

15. The switch of claim 9 further comprising a spring arm formed in a side wall of the first, second, third and fourth alignment grooves that deform to accept a piece of fiber in the grooves and once the fiber is disposed in the grooves the spring arm deflects to push the fiber against an opposite side wall of each groove.

16. The switch of claim 10 further comprising a plurality of spring arms formed in a side wall of each first, second, third and fourth alignment grooves that deform to accept a piece of fiber in the grooves and once the fiber is disposed in the grooves the spring arms deflect to push the fiber against an opposite side wall of each groove.

17. A method of making an optical switch, the method comprising the steps of:

forming a first alignment groove on a substrate wherein the first alignment groove extends from the first edge of the substrate to the center region of the substrate, the first alignment groove having a first center axis that extends down the center of the first alignment groove;

forming a second alignment groove on the substrate wherein the second alignment groove extends from the second edge of the substrate to the center region of the substrate, wherein the second edge of the substrate opposes the first edge of the substrate, the second alignment groove having a second center axis that extends down the center of the second alignment groove wherein the second center axis is offset from the first center axis;

forming a third alignment groove on the substrate wherein the third alignment groove extends from the third edge of the substrate to the center region of the substrate; the third alignment groove having a third center axis that extends down the center of the third alignment groove; and forming a fourth alignment groove on the substrate wherein the fourth alignment groove extends from the fourth edge of the substrate to the center region of the substrate, the fourth alignment groove having a fourth center axis that extends down the center of the fourth alignment groove wherein the fourth center axis is offset from the third center axis.

* * * * *